United States Patent [19]

Powers, Jr.

[11] 4,372,378
[45] Feb. 8, 1983

[54] SHUT-IN DEVICE FOR STOPPING THE FLOW OF HIGH PRESSURE FLUIDS

[75] Inventor: Jerrold V. Powers, Jr., Albuquerque, N. Mex.

[73] Assignee: The BDM Corporation, McLean, Va.

[21] Appl. No.: 245,150

[22] Filed: Mar. 18, 1981

[51] Int. Cl.³ ............................................. E21B 36/00
[52] U.S. Cl. ..................................... 166/57; 166/302; 175/17
[58] Field of Search ..................... 166/57, 302; 175/17; 137/59; 251/1 R; 165/74, 80 B, 96; 138/26, 27, 32, 37

[56] References Cited

U.S. PATENT DOCUMENTS

| | | | |
|---|---|---|---|
| 2,552,901 | 5/1951 | Miller | 166/302 |
| 3,411,156 | 11/1968 | Feher | 165/96 X |
| 3,738,424 | 6/1973 | Osmun et al. | 166/57 X |
| 3,880,236 | 4/1975 | Durning et al. | 166/57 X |
| 4,125,159 | 11/1978 | Vann | 166/57 X |

*Primary Examiner*—Ernest R. Purser
*Assistant Examiner*—Thuy M. Bui
*Attorney, Agent, or Firm*—Cahill, Sutton & Thomas

[57] ABSTRACT

A down hole shut-in device effects a stoppage of effluent from a blown-out oil well by freezing a plug of the effluent within the well. The down hole shut-in device is installed within a conventional tubing string or casing string and includes a tubular member having a structural outer wall and a relatively thin, heat-exchanging inner wall. During normal operations, a substantially non-compressible fluid is maintained within the volume bounded by the outer and inner walls for transmitting pressure exerted upon the thin inner wall to the structural outer wall. During a blow-out or other loss of well control, the substantially non-compressible fluid is replaced by a refrigerated fluid for removing heat from the effluent flowing within the tubular member. A series of flow deflectors are mounted to the inner wall and are normally flush therewith. Upon being cooled by circulation of the refrigerated fluid, the flow deflectors assume a curved shape and project into the path of the effluent, whereupon full deflector deployment ensues. Upon being deployed, the flow deflectors absorb heat from the effluent, deflect the effluent against the cold inner wall, and provide structural support for a condensed layer of effluent which eventually closes upon itself to form a frozen plug within the tubular member.

35 Claims, 12 Drawing Figures

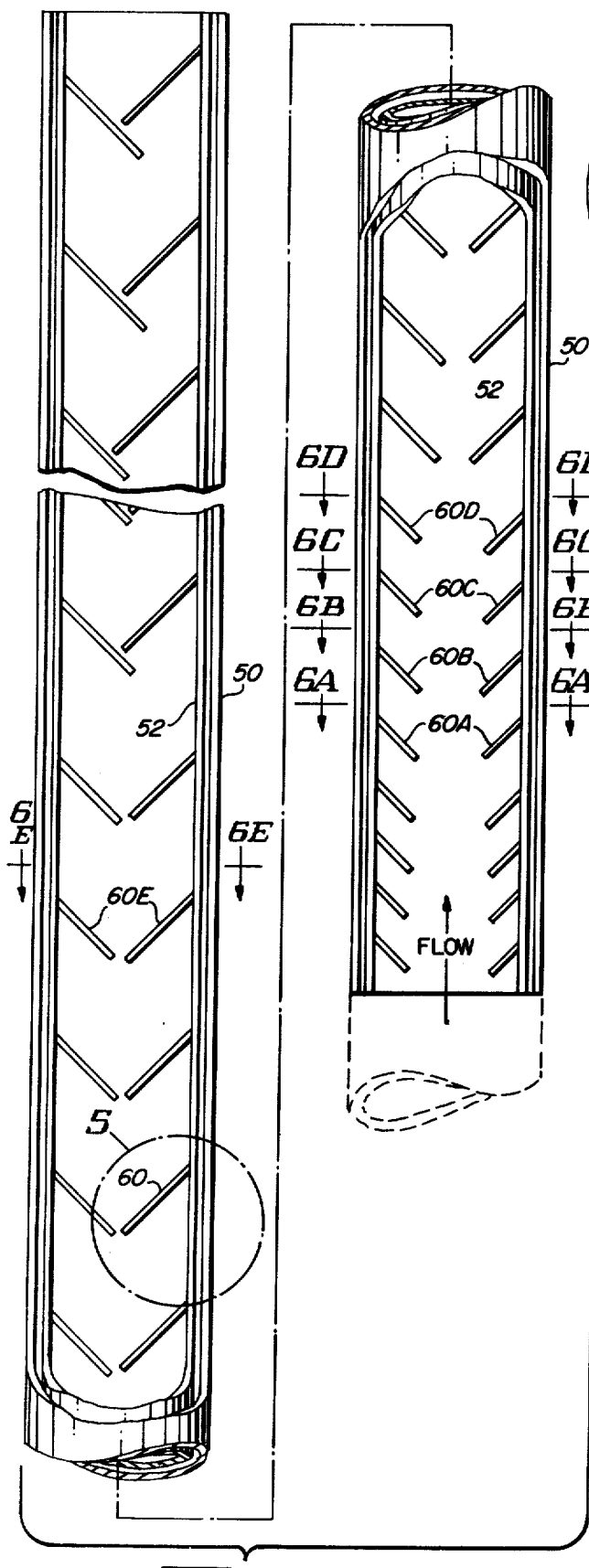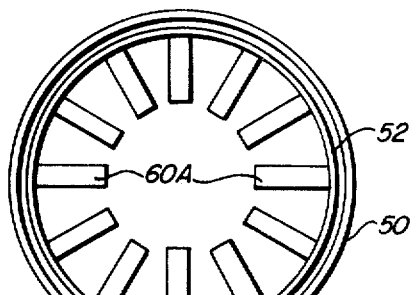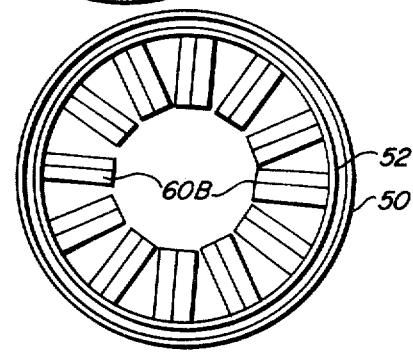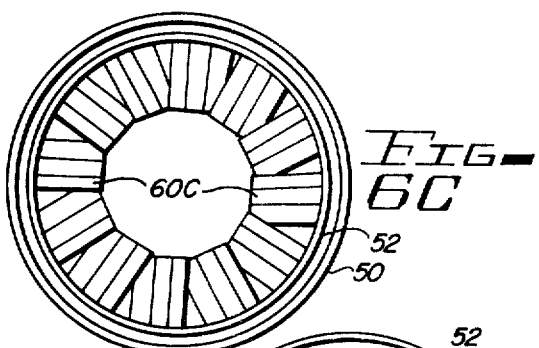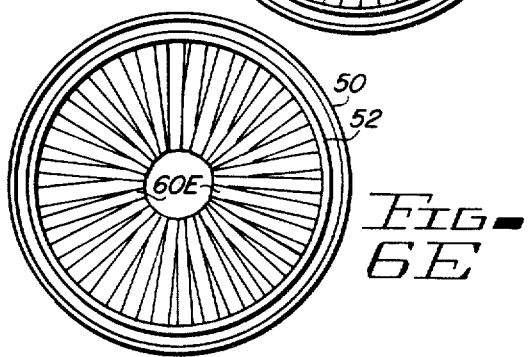

SHUT-IN DEVICE FOR STOPPING THE FLOW OF HIGH PRESSURE FLUIDS

BACKGROUND OF THE INVENTION

1. Field of the Invention

The present invention relates generally to devices for controlling the flow of effluent from a naturally or freely depleting oil well, and more particularly, to a device for stopping the flow of effluent from a blown-out or otherwise uncontrolled oil well by freezing a plug of effluent within the well.

2. Description of the Prior Art

Oil wells are drilled into oil bearing formations which often exert tremendous pressure upon the oil, gas, and other components of effluent that escape from the formation. For example, down hole pressures within an oil well are normally relatively high, and may exceed 20,000 pounds per square inch. If this pressure is unchecked, a blow-out will occur, and oil, gas and other matter will flow uncontrollably from the well. Blow-outs may occur either during drilling operations or during production operations.

During drilling operations, mud is typically pumped into the well to counteract pressures exerted by formations into which the well extends. As used herein, the term "mud" designates a drilling fluid containing a chemically complex series of compounds used to aid the drilling process. Prior to reaching high-pressure formations, weak formations are usually encountered during the course of drilling the well. These weaker formations will crater and ultimately be destroyed if exposed to the pressure exerted by very dense or heavy weight mud. Accordingly, it is desirable to use relatively lightweight mud when drilling through such weak formations until a protective casing string is installed within the wellbore. Following installation of the casing string, heavier weight mud can be pumped into the well for controlling high pressures exerted by formations located at greater depths. However, if formation pressures encountered within the well become much larger than were initially anticipated or accounted for at a given depth, the formation pressure pushes the insufficiently-dense mud out of the well, and a blow-out results. In some cases, the formation pressure is so unexpectedly large that the drill string used to drill the well is itself pushed out of the well.

During production operations on completed wells, a blow-out condition can result if damage occurs to the well head or Christmas tree assembly which normally controls pressures exerted within the well. In the case of off-shore oil wells, such damage is typically caused by collisions with ships or by violent weather conditions. Blow-out conditions have also been known to occur during the work-over of a well, i.e., during the time that production operations are temporarily halted to allow repair, replacement, or cleaning of valves, tubing, and other equipment associated with the well.

Regaining control of a high-pressure oil well which has blown-out or suffered surface damage is a time-consuming and hazardous operation, particularly for oil wells located off-shore. The uncontrolled flow of oil from the well results in severe pollution and waste problems, and the area near the well head may become engulfed in flames. Thus, oil well blow-outs can cause astronomical financial losses and major environmental problems. Furthermore, attempts to regain control of such blown-out oil wells can result in severe injuries or deaths.

At present, efficient oil well disaster control principally relies upon prevention of blow-outs. Devices known as blow-out preventers are typically used during drilling operations for controlling unexpected pressures within the well. Blow-out preventers have generally been successful in preventing blow-out conditions during drilling operations. However, blow-outs still occur during drilling operations by exceeding design limits, or by improper operation or malfunction of the blow-out preventer. Devices known as down hole storm chokes are typically utilized in conjunction with producing oil wells. However, down hole storm chokes are continually exposed to an abrasive, high temperature environment. Therefore these storm choke devices are soon degraded by their operating environment and frequently malfunction.

One method of controlling a blown-out oil well is disclosed in U.S. Pat. No. 3,738,424. The patent disclosure is particularly directed to controlling blow-outs in off-shore, producing oil wells. Following installation of the intermediate casing within the well, valves are welded to the external surface of the outermost casing by divers who perform the welding operations under water. Each valve receives a drill bit for drilling a hole through the various layers of casing in the event of a blow-out after production operations have commenced. After a hole has been drilled through the layers of casing proximate to each valve, the drill bits are removed from the valves, and tubes for circulating liquid nitrogen are connected to the valves. The liquid nitrogen is circulated adjacent the production tubing string for freezing a solid plug therein.

The method for controlling blown-out oil wells disclosed in the above mentioned U.S. patent has several disadvantageous limitations. The method disclosed therein is limited to controlling the well at a point located above the surface of the ground or ocean floor into which the well extends since it is not apparent how the various assortment of valves, drill bits, and tubing can otherwise be attached to the well and manipulated in the event of a blow-out. The need for divers to install the necessary equipment and to manipulate the equipment in close proximity to the hazardous area resulting from the blow-out is also a disadvantage. Furthermore, the method of controlling a blow-out disclosed by the above mentioned patent is operative only to freeze a plug within the production tubing string; it may not be used to control a blow-out that occurs during drilling operations. Also, the above described method is not effective to freeze a plug of effluent in the event of a packer blow-out. A packer blow-out can occur upon failure of the packer installed in a producing well to seal the annulus between the production casing string and the production tubing string above the oil producing zone. When a packer blow-out occurs, effluent flows uncontrollably out of the well through the production casing string external from the production tubing string.

Accordingly, it is an object of the present invention to provide a down hole shut-in device which can be easily installed within an oil well below the surface of the ground or ocean floor for stopping the flow of effluent from a blown-out oil well.

It is another object of the present invention to provide a shut-in device which can be used either during drilling operations or during production operations for stopping the flow of effluent from a blown-out oil well.

It is a further object of the present invention to provide a shut-in device for stopping the flow of effluent from a blown-out oil well, which device may be integrated into a convenitonal oil well casing string or tubing string.

It is yet a further object of the present invention to provide a shut-in device for stopping the flow of effluent from a blown-out or otherwise uncontrolled well wherein no mechanically deployed elements or mechanically actuated seals, of the type utilized in present oil well control devices, are required in order that the downhole shut-in device be relatively immune from abrasive wear.

It is a still further object of the present invention to provide a shut-in device for stopping the flow of effluent from a blown-out oil well located off-shore wherein divers and other personnel are not required to work in close proximity to the oil well in order to actuate the shut-in device.

It is another object of the present invention to provide a shut-in device for forming a frozen plug of effluent within the affected casing string of an oil well during drilling operations when a blow-out occurs.

It is still another object of the present invention to provide a shut-in device for forming a frozen plug of effluent within the annulus formed between the production casing string and the production tubing string in a completed, producing oil well when a blow-out occurs.

It is a further object of the present invention to provide a shut-in device for quickly and reliably forming a frozen plug of effluent within the production tubing string of a completed, producing oil well when a blow-out condition occurs.

It is a still further object of the present invention to provide a shut-in device for stopping the flow of effluent from a blown-out oil well, which device does not interfere with the passage of drilling equipment, fishing tools, instrument probes, or other oil well tools inserted into the well.

Another object of the present invention is to provide a shut-in device for stopping the flow of effluent from a blown-out oil well wherein no substantial changes in oil well drilling procedures or tooling are required.

Still another object of the present invention is to provide a shut-in device which may be remotely activated for effecting a total stoppage of effluent from a blown-out oil well.

A still further object of the present invention is to provide a shut-in device for stopping the flow of effluent from a blown-out oil well wherein activation of the shut-in device does not impede subsequent resumption of drilling or production operations after control of the oil well has been regained.

SUMMARY OF THE INVENTION

Briefly described, and in accordance with one embodiment thereof, the present invention relates to a shut-in device for controlling the flow of a high-pressure effluent through a path by forming a frozen plug of the effluent within the path. The shut-in device includes a tubular member having a structural outer wall and a relatively thin, heat-exchanging inner wall, the outer and inner walls bounding a volume. The tubular member is located within the path of effluent flow, the effluent flowing within the inner wall of the tubular member. Mounted to the inner surface of the inner wall of the tubular member are a series of flow deflectors. The flow deflectors normally extend flush against the inner wall in a stowed position to avoid interfering with the passage of effluent, mud, tools, or other matter within the inner wall of the tubular member. If the flow of effluent should become uncontrollable, a refrigerated fluid is circulated through the volume bounded by the outer and inner walls of the tubular member for removing heat from the inner wall and consequently removing heat from effluent in heat-exchange contact with the inner wall. The flow deflectors are also cooled by circulation of the refrigerated fluid and respond thereto by forming a curved shape corresponding to a deployed position projecting into the path of the effluent. The flow deflectors aid in cooling the effluent, both by directly absorbing heat from the effluent and by directing the flow of the effluent into contact with the cold inner wall of the tubular member. The flow deflectors further provide structural support for a condensed layer of effluent which builds up and eventually closes to form a frozen plug of effluent within the tubular member, thereby stopping the flow of effluent. During normal operations when effluent flow is controllable, the volume bounded by the outer and inner walls of the tubular member is supplied with a substantially non-compressible, non-refrigerated fluid which transmits pressure exerted upon the relatively thin inner wall to the structurally sound outer wall.

In the preferred embodiment of the invention, the shut-in device is installed down hole within an oil well for stopping the flow of effluent following a blow-out or other loss of well control. The tubular member may advantageously be of the same length and inner diameter as conventional oil well casing or tubing sections or joints, and may have threaded ends for being joined thereto and integrated therewith. The shut-in device may be utilized either within a casing string during drilling operations or within a production tubing string or a production casing string during production operations. An inlet line extends from the drilling surface down into the well and communicates with the tubular member for conducting either the refrigerated fluid or the substantially non-compressible, non-refrigerated fluid to the volume bounded by the outer and inner walls. An outlet is also provided for venting fluid from the volume bounded by the outer and inner walls. Following deployment of the shut-in device and the making of appropriate repairs at the surface, the refrigerated fluid within the volume bounded by the outer and inner walls is gradually warmed and eventually replaced by the substantially non-compressible, non-refrigerated fluid to effect thawing of the frozen plug of effluent and retraction of the flow deflectors to their stowed position for allowing resumption of normal drilling or production operations.

BRIEF DESCRIPTION OF THE DRAWINGS

FIG. 4 is a longitudinal cross-sectional representation of the down hole shut-in device shown in FIG. 3.

FIGS. 6A–6E are radial cross-sectional views taken through lines 6A—6A, 6B—6B, 6C—6C, 6D—6D, and 6E—6E, respectively, as shown in FIG. 4.

DETAILED DESCRIPTION OF THE PREFERRED EMBODIMENT

Figure 1:
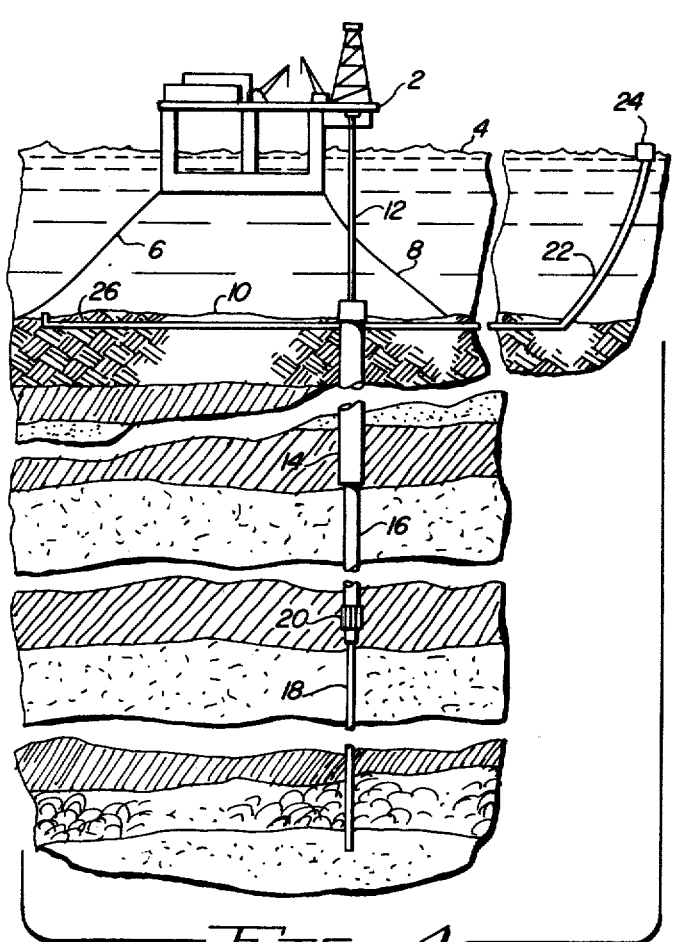
FIG. 1 is a cross-sectional view of an off-shore oil well into which a down hole shut-in device has been incorporated during drilling operations.

In FIG. 1, an off-shore oil well drilling rig is shown. The off-shore drilling rig includes a drilling platform 2 extending above the ocean surface 4 and secured by anchor lines 6 and 8 to the ocean floor 10. A drilling string 12 extends from drilling platform 2 into the ocean floor for drilling the well. Before starting drilling operations, a complete casing program is developed using geophysical information such as seismograph readings and information obtained from neighboring wells. The first few hundred feet of the well are typically drilled with a relatively large bit to form a bore of approximately 26 inches in diameter. Following the first few hundred feet of drilling, surface casing (designated 14 in FIG. 1) approximately 18 inches to 20 inches in diameter is set in place to serve as an anchor for a casing head (not shown) which serves as a base or hard point for other drilling equipment such as conventional blow-out preventer stacks, subsequent casing, and valves and chokes used in circulating mud through the well bore. The shallow rock formations initially encountered in drilling a well usually drill rapidly, and the surface casing 14 is installed before drilling becomes harder.

After the well has been drilled to a predetermined depth, an intermediate casing string is typically installed within the well extending through the surface casing. The purpose of the intermediate casing string is to provide protection for weak zones in the upper portion of the well bore which might rupture due to the pressure exerted by the heavier weight mud required when subsequently drilling into high pressure formations. The predetermined depth at which the intermediate casing string is installed is selected to reach all formations unable to hold the weight of the mud that is anticipated to be used when drilling deeper portions of the well where high pressures are encountered.

The intermediate casing string, shown as 16 within FIG. 1, may extend as far as 10,000 feet or more below the surface of the formation into which the well is drilled. After the intermediate casing string has been lowered into the well, the annulus between the intermediate casing string and the well bore is filled with casing cement to rigidly anchor the intermediate casing string within the well. In addition to reinforcing weak formations, the intermediate casing string forms a smooth, uniformly round path within the well through which drilling tools may be subsequently inserted.

After the intermediate casing string 16 has been installed within the well, the well is typically drilled open hole to its final depth, the resulting well bore being designated by 18 in FIG. 1. It is during this stage of the drilling process that the maximum formation pressures are typically encountered and the chances of a blow-out are greatest. Heavy weight mud is pumped into the well bore to counteract high pressures exerted by formations in lower portions of the well. However, if the pressure encountered at a particular depth is much greater than anticipated, the weight of the mud may be overcome, resulting in the mud being expelled from the well. In this event, the blow-out preventer stack would typically be actuated to seal off the well. However, as mentioned above, the blow-out preventer stack may fail to operate properly for a number of reasons.

In order to back up the conventional blow-out preventer stack, a down hole shut-in device 20, of the type embodying the present invention, is integrated within intermediate casing string 16 during installation thereof. As shown in FIG. 1, an inlet conduit 22 extends upwardly from down hole shut-in device 20 to a buoy 24 disposed at a safe distance from drilling platform 2. An outlet conduit 26 also extends from down hole shut-in device 20 to a point just above the ocean floor 10. Inlet conduit 22 and outlet conduit 26 extend through the interior of surface casing 14 and adjacent the outer surface of intermediate casing 16. Hence, conduits 22 and 26 become embedded in the casing cement subsequently injected around the outer surface of intermediate casing string 16. Details concerning the construction and operation of down hole shut-in device 20 are described below.

When the well has been drilled to its predetermined final depth, the drilling phase is at an end and the well completion phase begins. During the well completion phase, a production casing string 28 is installed within the well through intermediate casing string 16 and extending to the bottom of the well bore (see FIG. 2). A casing shoe 29 is formed at the bottom of the well bore in a known manner to seal the lower end of production casing string 28.

After production casing string 28 has been installed within the well bore, perforations 30 are formed within the production casing string at the pay zone, i.e., the depth corresponding to the oil producing formations. Production tubing string 32 is then lowered into the well through production casing string 28. Production tubing string 32 is typically two to three inches in diameter and extends into the well to the depth of the oil producing formations. The portion of the annulus between production tubing string 32 and production casing string 28 above the oil producing formations is sealed with a packing device 34 for blocking the flow of oil through the annulus and forcing the oil to flow upwardly through production tubing string 32.

Figure 2:
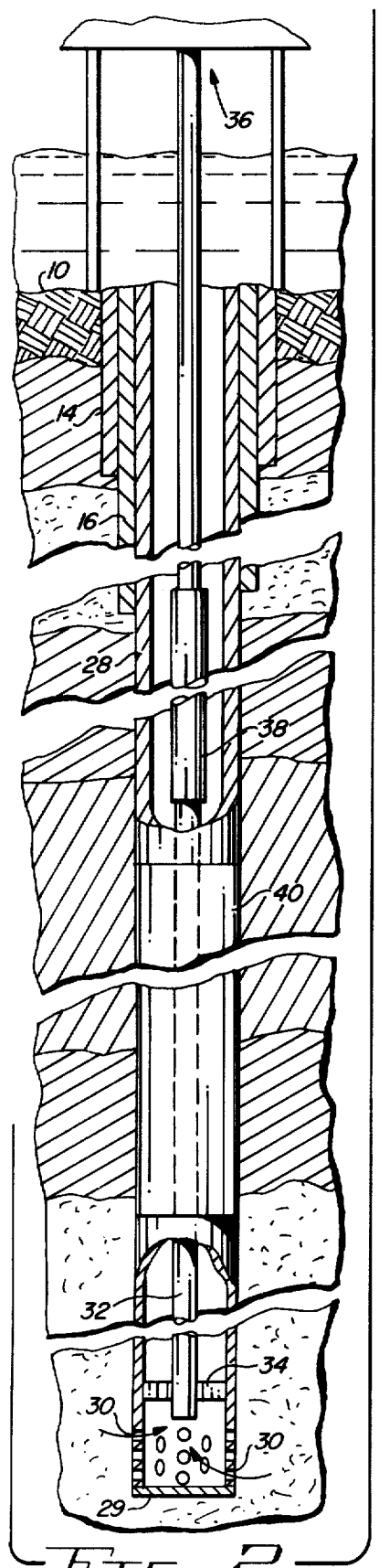
FIG. 2 is a cross-sectional view of an off-shore oil well wherein down hole shut-in devices have been incorporated within the production casing string and within the production tubing string.

After production casing string 28 has been set, the pay zone perforated, production tubing string 32 installed, and packing device 34 set, a so-called Christmas tree assembly (designated generally by reference numeral 36 in FIG. 2) is installed at the upper end of the production tubing string for controlling the flow of oil from the well. In the case of off-shore oil wells, it is also common for a down hole device called a storm choke (not shown) to be installed within the well to bring the well under control should the Christmas tree assembly be damaged. However, as noted above, down hole storm chokes are continually exposed to an abrasive, high temperature environment and often malfunction. Accordingly, a down hole shut-in device 38 is incorporated within production tubing string 32 as shown in FIG. 2 for selectively stopping the upward flow of crude oil and gas through production tubing string 32. An additional down hole shut-in device 40 is incorporated within production casing string 28 for selectively stopping the upward flow of crude oil and gas through the annulus between production tubing string 32 and production casing string 28 in the event that packing device 34 should fail. There is a possibility that uncontrolled upward flow of effluent could also occur through the annulus formed between intermediate casing string 16 and production casing string 28. In this event, down hole shut-in device 20, installed during the drilling phase within intermediate casing string 16, could be actuated to stop the flow. As in the case of down hole shut-in device 20 incorporated within the intermediate casing string 16 (see FIG. 1), an inlet conduit and an outlet conduit (not shown) extend from down hole shut-in device 40 adjacent the outer periphery of production casing string 28 through intermediate casing string 16 to the upper end of the well. Similarly, an inlet conduit and an outlet conduit (not shown) extend from down hole shut-in device 38 to the upper portion of the well within the annulus formed between production tubing string 32 and production casing string 28. Further details concerning the construction and operation of down hole shut-in devices 38 and 40 are described below.

Referring now to FIGS. 3-6, down hole shut-in device 20 is shown in further detail. For clarity, FIGS. 3-6 omit the drill string 12 which normally extends through down hole shut-in device 20. As will be explained below, the down hole shut-in device 20 can be actuated whether or not drill string 12 is present. The description below will make specific reference to down hole shut-in device 20 incorporated within intermediate casing string 16; however, the description of the construction and operation of down hole shut-in device 20 is equally applicable to down hole shut-in devices 38 and 40 installed within the production tubing string 32 and production casing string 40, respectively, shown in FIG. 2. Intermediate casing string 16 is conventionally formed by joining sections of casing end to end, each section of casing being approximately thirty feet in length. Down hole shut-in device 20 is installed between two such sections of casing 42 and 44. In order that down hole shut-in device 20 may be installed as would any other section of standard casing, the down hole shut-in device may also be approximately thirty feet in length. Similarly, the inner diameter of down hole shut-in device 20 is made approximately equal to the inner diameter of the sections of casing forming intermediate casing string 16. The outer diameter of down hole shut-in device 20, though somewhat greater than the outer diameter of the sections of casing to which it is attached, is sized to easily fit through the same well bore and casing strings that its companion casing is designed to fit through. The ends of down hole shut-in device 20 are externally threaded and coupled to adjacent casing sections 42 and 44 by conventional threaded casing coupling members 46 and 48 each of which engages an externally threaded end of down hole shut-in device 20 and an externally threaded end of the adjacent section of casing. Similarly, the length and size of down hole shut-in devices 38 and 40 are substantially equal to those for conventional sections of production tubing and production casing, respectively. Thus, incorporation of the down hole shut-in device within a conventional casing string or production tubing string requires virtually no modification of presently used drilling processes or oil production processes; standard sized drilling bits and standard oil field rigging are utilized to form the well.

Figure 5:
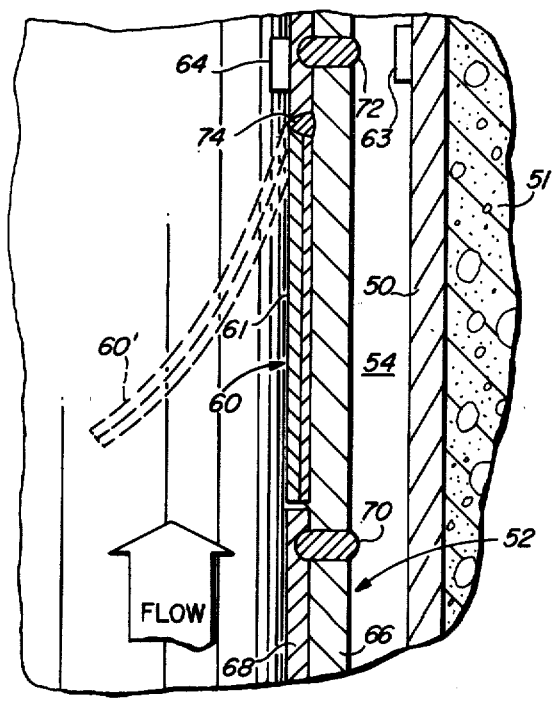
FIG. 5 is an enlarged view of one of the flow deflectors shown in FIG. 4.
Figure 3:
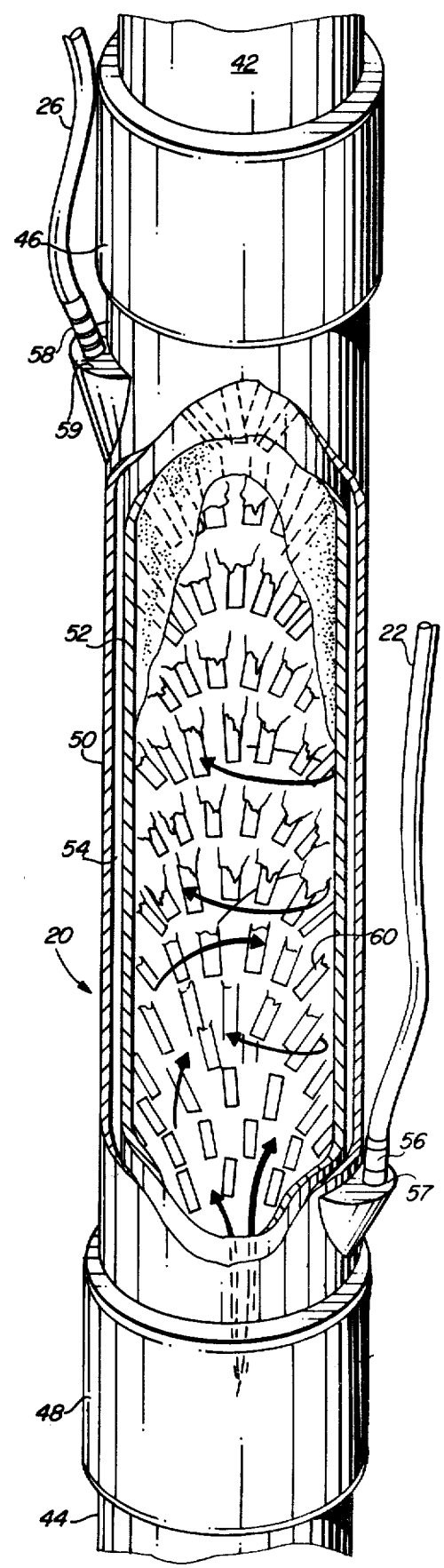
FIG. 3 is a cutaway perspective view of the down hole shut-in device incorporated within a casing string.

As shown in FIGS. 3 and 5, down hole shut-in device 20 is a tubular member having a cylindrical structural outer wall 50 which is ultimately surrounded by casing cement 51 as shown in FIG. 4. Concentric with and internal to outer wall 50 is a cylindrical inner wall 52. Outer wall 50 and inner wall 52 are spaced apart from one another to form a fluid containing volume 54 extending the entire length of down hole shut-in device 20 between outer wall 50 and the outer surface of inner wall 52.

As will be explained below, in the event of a blow-out or other loss of well control, the down hole shut-in device is actuated by circulating a refrigerated fluid through volume 54. The refrigerated fluid utilized may be a cryogen, in which case outer wall 50 and inner wall 52 become extremely cold. Standard oil field materials are normally made of moderate or high temperature steel which can become brittle and crack at cryogenic temperatures. Accordingly, outer wall 50 and inner wall 52 are preferably made of a material adapted to withstand such extremely cold temperatures without damage, which material may be, for example, type 304 stainless steel. The sections of casing 42 and 44 immediately above and below down hole shut-in device 20 may also be made of stainless steel to act as a thermal buffer between the down hole shut-in device and the non-cryogenic compatible sections of conventional casing.

As shown in FIG. 3, refrigerated fluid inlet conduit 22 is coupled to inlet fitting 56 which communicates with volume 54 for introducing refrigerated fluid into the lower portion thereof in the event of a blow-out or other loss of well control. Outlet conduit 26 is coupled to outlet fitting 58 which communicates with volume 54 for venting refrigerated fluid from the upper portion thereof. Fittings 56 and 58 are disposed on lower and upper shoulder portions 57 and 59, respectively, of down hole shut-in device 20, shoulder portions 57 and 59 serving to protect conduits 22 and 26 as down hole shut-in device 20 is lowered into the well. To further protect conduits 22 and 26, a thin band of plastic can be used to secure such conduits to each section of casing lowered into the well. The size of inlet conduit 22 and outlet conduit 26 are determined by heat removal requirements when the down hole shut-in device is activated as well as by the annular space available for routing such conduits to the surface. Venting of refrigerated fluid from volume 54 may be augmented by releasing the refrigerated fluid directly into the flowing well fluid through initially sealed openings (not shown) within inner wall 52.

As will be explained below, refrigerated fluid is circulated within volume 54 only in the event of a blow-out or other loss of well control. Inner wall 52 is made relatively thin to aid rapid heat transfer between the refrigerated fluid and the well fluids. During normal drilling operations (in the case of down hole shut-in device 20) or normal oil production operations (in the case of down hole shut-in devices 38 and 40), a substantially non-compressible, non-refrigerated fluid is maintained within volume 54 in order to transmit pressures exerted upon the inner surface of relatively thin inner wall 52 to the structural outer wall 50 and ultimately, in the case of down hole shut-in devices 20, to the adjacent casing cement 51 and surrounding rock formations. The non-compressible fluid may be water but is preferably ethylene glycol since down hole temperatures may be hot enough to boil water. The non-compressible fluid is introduced into volume 54 through inlet conduit 22 which is coupled to a supply of such fluid located at the top of the well. Outlet conduit 26 is closed to avoid releasing the pressure exerted upon the non-compressible fluid within volume 54.

Pressure exerted upon the inner surface of inner wall 52 by the well may reach 20,000 pounds per square inch. Were volume 54 not filled with a non-compressible fluid, then inner wall 52 would likely fracture or explode when subjected to such pressures. Accordingly, during normal operations, the non-compressible fluid within volume 54 is maintained under pressure to counteract the pressure exerted upon inner wall 52 by the well. On the other hand, since inner wall 52 is relatively thin in order to maximize heat transfer, the pressure exerted upon the non-compressible fluid within volume 54 must be prevented from greatly exceeding the pressure exerted upon inner wall 52 by the well. Ideally, the pressure exerted upon the non-compressible fluid within volume 54 should match the pressure exerted upon inner wall 52 by the well.

Down hole shut-in device 20 may be constructed to include a first pressure transducer 63 disposed within the volume enclosed by the inner surface of inner wall 52 and a second pressure transducer 64 disposed within volume 54 for measuring the pressure exerted upon the inner and outer surfaces, respectively, of inner wall 52. Electrical signals generated by such pressure transducers are carried to the surface by electrical conductors (not shown) parallelling inlet conduit 22. The electrical signals generated by these pressure transducers are then used by a pressure regulating mechanism to control the pressure exerted upon the non-compressible fluid supplied to volume 54 through inlet conduit 22 in order to maintain the pressure differential across inner wall 52 close to zero.

As shown in FIG. 3, a plurality of flow deflectors, one of which is designated by reference numeral 60, are secured at the upper ends thereof to the inner surface of inner wall 52 for selectively projecting into the path of effluent flowing upwardly through down hole shut-in device 20. The purpose of flow deflectors 60 is to aid in the formation of a frozen plug of effluent within down hole shut-in device 20 in the event of a blow-out or other loss of well control. During normal operations, flow deflectors 60 lie in a stowed position essentially flush against inner wall 52 and extend downwardly from their secured ends in a direction opposite to the upward flow of well fluids, as shown by the solid lines designated 60 in FIG. 5. However, upon being cooled through circulation of a refrigerated fluid within volume 54 when control over the well is lost, flow deflectors 60 project into the path of the rapidly moving effluent flowing upwardly through the well. The force of the rapidly moving effluent causes flow deflectors 60 to be extended to their fully deployed position at an angle of approximately 45 degrees to the longitudinal axis of the well, as shown by the dashed line 60' in FIG. 5.

As shown in FIGS. 4 and 6A-6E, the length and number of flow deflectors varies along the length of the down hole shut-in device. Near the bottom portion or entry end of the down hole shut-in device, flow deflectors 60A are spaced radially apart from one another with rather large gaps therebetween. Moreover, flow deflectors 60A are relatively short and extend toward the longitudinal axis of the down hole shut-in device for only approximately one-half the radial distance between the longitudinal axis and the inner surface of inner wall 52. In moving from the lower portion or entry end of the down hole shut-in device toward the upper portion or exit end, the number of flow deflectors disposed at a particular point along the longitudinal axis of the down hole shut-in devices increases, as shown in FIGS. 6B-6E. The angular orientation of the flow deflectors may be shifted between adjacent sets of flow deflectors in order to effect optical density while maintaining flow transparency. Also, in progressing from the entry end to the exit end, the radial spacing between such flow deflectors is decreased while the length of the flow deflectors is increased. As shown in FIG. 4, the flow deflectors in the upper portion of the down hole shut-in device extend beyond the longitudinal axis. However, the flow deflectors in the upper portion of the down hole shut-in device are staggered from one another in the form of a helix for allowing the down hole shut-in device to remain transparent to flow while providing optical density. Flow will then be constrained generally along the helix, further lengthening the contact time during which heat transfer can occur. The particular arrangement of the flow deflectors described above minimizes the structural strength requirements for the individual flow deflectors while causing the well fluids to remain in contact with the condensing surfaces for a time sufficient to cause progressive condensation and freezing.

As shown in FIG. 5, flow deflectors 60 each include a layer 61 of a first type of material attached to a layer 62 of a second type of material, the first and second materials having dissimilar rates of expansion (hence, dissimilar rates of contraction) with respect to changes in temperature. Preferably, layers 61 and 62 are metallic and are welded together. Layers 61 and 62 are disposed such that layer 61 contracts faster than layer 62 whereby flow deflector 60 projects away from inner wall 52 upon being sufficiently cooled. Possible selections of materials for layers 61 and 62 include copper and aluminum, respectively, as well as copper and nickel-steel, respectively.

Inner wall 52 may be formed as a single cylindrical layer of stainless steel but is preferably formed as a composite of two contiguos stainless steel layers 66 and 68 attached to one another by plug welds 70 and 72 as shown in FIG. 5. The overall thickness of inner wall 52 is less than or equal to one-half inch, preferably within the range of one-eighth to one-half inch, to allow for rapid heat transfer thereacross. Layer 68 is of a thickness commensurate with the thickness of flow deflectors 60. Portions of layer 68 of inner wall 52 are cut away to receive each of the flow deflectors 60. The upper end of each flow deflector 60 is welded to layer 66 of inner wall 52 by weld 74 so that each flow deflector 60 is substantially coplanar with and housed within layer 68 when in the retracted or stowed position. In order to facilitate the operation of welding the plurality of flow deflectors to inner wall 52, the down hole shut-in device may be constructed from two semi-cylindrical halves which are welded together to form a continuous cylinder after the flow deflectors have been installed. After welding the flow deflectors to inner wall 52, the down hole shut-in device assembly may be turned on a grinding machine for grinding down the plurality of flow deflectors and conforming them to the shape of inner wall 52. This machining operation ensures that the flow deflectors remain substantially flush against inner wall 52 when not deployed.

With regard to down hole shut-in device 20 installed within intermediate casing string 16 during drilling operations, flow deflectors 60 must remain relatively flush against inner wall 52 to avoid being deployed by reason of mud or rocks flowing upwardly through the casing string and forcing the free ends of the flow deflectors away from inner wall 52. The flow deflectors need not be perfectly flush with inner wall 52 since the flow of mud and other materials will normally be relatively slow during drilling operations, typically within the range of 2 to 3 feet per second. In comparison, during an actual blow-out or loss of well control, the flow rate may increase to within the range of 10 to 100 feet per second through the affected casing string or tubing string at the depth at which the down hole shut-in device is installed. However, to further minimize the chance that the flow deflectors will become deployed until the down hole shut-in device is actuated by the circulation of refrigerated fluid therethrough, layer 68 of inner wall 52 is artificially roughened or scored by the formation of grooves or knurls in order to increase flow resistance proximate inner wall 52. The increased flow resistance adjacent inner wall 52 results in a thickened boundary layer adjacent thereto wherein fluid velocity is essentially zero. The thickened boundary layer resulting from the artificial roughening of inner wall 52 further reduces the possibility that the flow deflectors will be forced into their deployed position until they are triggered by the circulation of refrigerated fluid through volume 54. The formation of grooves or knurls within layer 68 of inner wall 52 also increases the surface area of inner wall 52 exposed to effluent flowing through the down hole shut-in device, thereby allowing for increased heat exchange efficiency between the effluent and the refrigerated fluid circulated within volume 54. The increased flow resistance effected by the grooves or knurls within layer 68 also results in effluent flowing more slowly past inner wall 52 during a blow-out condition, thereby allowing the refrigerated fluid within volume 54 to remove more heat from the effluent. In addition to the advantages set forth above, the knurls or grooves formed upon the inner surface of inner wall 52 help to secure the condensed layer of frozen effluent.

As mentioned above, during a blow-out or other loss of well control, the down hole shut-in device is actuated by circulating a refrigerated fluid through volume 54 for causing a frozen plug of effluent to form within the down hole shut-in device. Cooling of inner wall 52 effected by circulation of the refrigerated fluid through volume 54 causes flow deflector 60 to curve away from the boundary layer adjacent inner wall 52 and into the path of the rapidly moving effluent, whereupon they are deployed to their fully extended position at an angle of approximately 45 degrees to the longitudinal axis of the well. Flow deflectors 60 serve a number of purposes. First, the flow deflectors cause the effluent to be constantly deflected against the cooled inner wall 52. By deflecting the path taken by the effluent, the flow deflectors increase the time required for the effluent to traverse the length of the down hole shut-in device by several times. Secondly, the flow deflectors themselves are cooled conductively by inner wall 52 and hence act themselves as heat exchanging elements. Finally, as a condensed layer of effluent begins to build within the down hole shut-in device, the flow deflectors provide structural support for the condensed layer of effluent which builds up upon inner wall 52 and eventually closes upon itself to form a frozen plug within the down hole shut-in device.

Those skilled in the art will realize that down hole shut-in device 20 remains effective whether or not drill string 12 is ejected from the well following a blow-out. Typically, drill string 12 will remain in the well, in which case flow deflectors 70 will simply contact and rest against drilling string 12 upon being deployed. However, if the pressure exerted by the well is of sufficient force to eject drilling string 12 from the well, or if drilling string 12 is otherwise not present within down hole shut-in device 20, then the flow deflectors will be deployed in the manner illustrated in FIG. 4. Similarly, in the case of down hole shut-in device 40 installed within production casing 28 (see FIG. 2), the deployed flow deflectors will extend toward and rest against the portion of production tubing string 32 that extends within down hole shut-in device 40 but will otherwise function in the manner already described.

The refrigerated fluid circulated within volume 54 of the down hole shut-in device following a blow-out or other loss of well control may be of several types. For example, the refrigerated fluid may be ammonia in gaseous phase, cooled to approximately $-150°$ F. However, the refrigerated fluid is preferably a cryogen in liquid phase cooled to a temperature at or below 150° Kelvin. Liquid nitrogen is a preferred cryogen as it is relatively inexpensive and non-explosive. Other cryogens which may be used include helium, hydrogen, argon, xenon, neon, and krypton. Liquified oxygen and methane may also be used but pose a danger of explosion.

Assuming that liquid nitrogen is utilized as the refrigerated fluid, the deployment of the down hole shut-in device is initiated by purging the non-compressible, non-refrigerated fluid by circulating dry gaseous nitrogen through inlet conduit 22 to volume 54 and opening outlet conduit 26. The dry gaseous nitrogen is followed by nitrogen of successively lower temperatures until only liquid nitrogen is present. The incoming liquid nitrogen absorbs the heat supplied to the down hole shut-in device by the well fluids. The heat capacity and heat of vaporization of liquid nitrogen allow it to absorb sufficient amounts of heat to freeze the well fluids. A liquid nitrogen flow rate of approximately 0.2 cubic feet per minute is sufficient to cause a frozen plug of effluent to form within a well in approximately four days assuming that the well initially flows at the rate of 50,000 barrels per day. Again assuming an initial flow rate of 50,000 barrels per day from the well, the down hole shut-in device would require approximately 2500 gallons of liquid nitrogen through the first day; 1350 gallons of liquid nitrogen the second day; 640 gallons of liquid nitrogen the third day; and approximately 135 gallons of liquid nitrogen per day thereafter to sustain the frozen plug of effluent within the down hole shut-in device. A barge equipped with one 3600 storage dewar and a 5 ton per day air separation plant would easily accommodate the needs of the down hole shut-in device. The actual time required to freeze the plug for any particular well will depend upon several factors, including the flow rate of the well fluids through the down hole shut-in device, the temperature of the well fluids, the pressure being exerted by the well, the momentum of the well fluids, and the rate at which refrigerated fluid is circulated through the down hole shut-in device.

Figure 7:
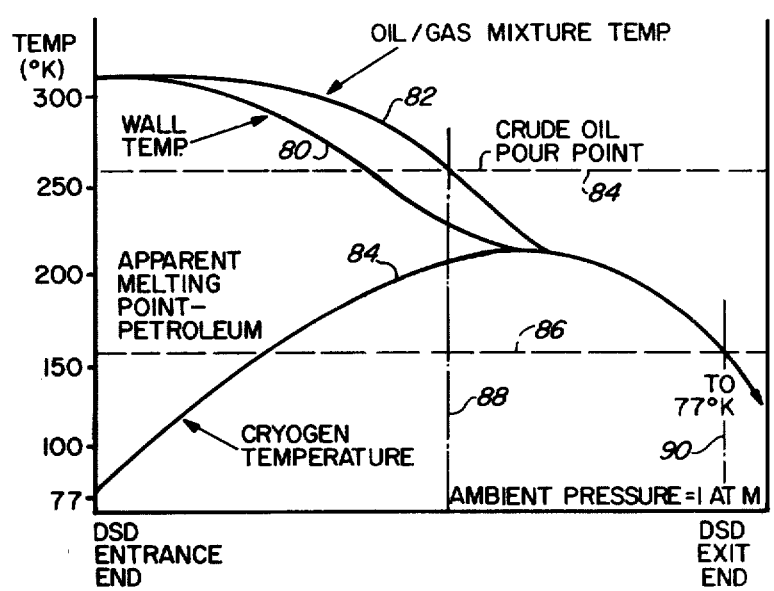
FIG. 7 is a temperature profile graph showing the relationship between the temperatures of the refrigerated fluid, the inner wall of the down hole shut-in device, and the effluent versus the corresponding longitudinal position within the down hole shut-in device.

The principle of the down hole shut-in device is based upon the transfer of heat from the effluent (flowing petroleum) to the refrigerated fluid. Crude oil has a strongly temperature-dependent viscosity. FIG. 7 illustrates representative temperature profiles within the down hole shut-in device after it has been activated. Curve 78 within the graph shown in FIG. 7 corresponds to the temperature of the refrigerated fluid within volume 54 of the down hole shut-in device. Curve 80 within the graph shown in FIG. 7 corresponds to the temperature of inner wall 52 of the down hole shut-in device. Curve 82 within the graph shown in FIG. 7 corresponds to the temperature of the crude oil within the down hole shut-in device. The crude oil pour point, shown in FIG. 7 by dashed line 84, corresponds to the temperature at which the crude oil becomes very viscous and waxy. In reality, the pour point is not a single temperature but rather a temperature range corresponding to the pour points of the various constituents of the crude oil. Once the down hole shut-in device is activated, the crude oil will build up as a waxy layer on those condensing surfaces within the down hole shut-in device that are at or below the crude oil pour point temperature. The apparent melting point (or alternatively, freezing point) of the crude oil is shown by dashed line 86 within FIG. 7. As indicated in the graph shown in FIG. 7, the temperature of the crude oil near the exit end of the down hole shut-in device is below the apparent melting point and results in the formation of a frozen plug which eventually closes off the flow of crude oil through the down hole shut-in device. Within the graph shown in FIG. 7, dashed vertical lines 88 and 90 intersect the horizontal axis of the graph at the points at which the condensed layer of crude oil initially begins to form and finally freezes closed, respectively.

Figure 8:
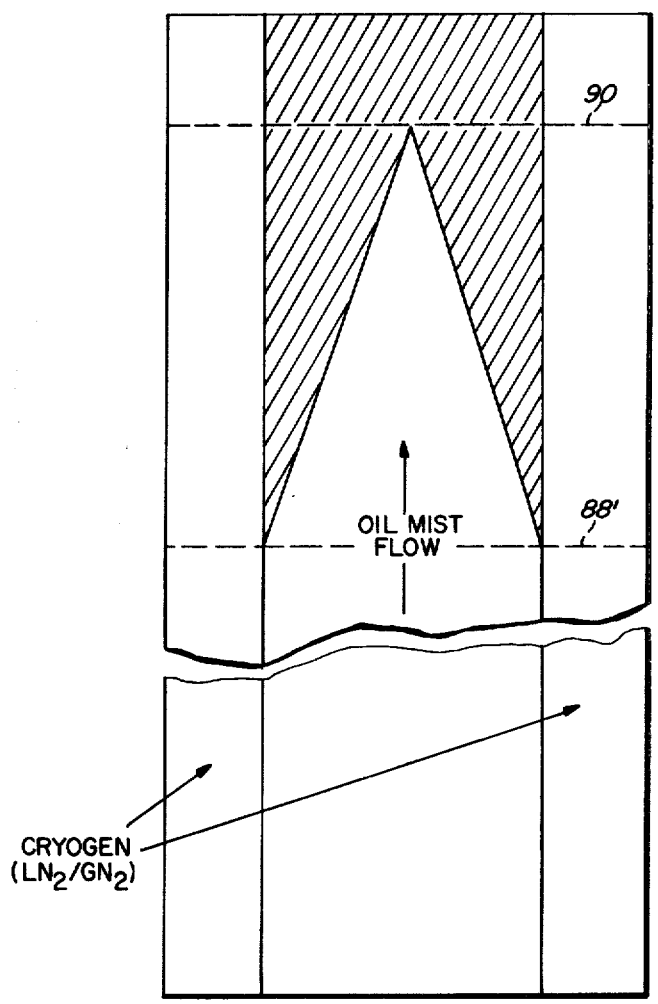
FIG. 8 is a cross-sectional view of the down hole shut-in device illustrating the manner in which the frozen plug of effluent is formed.

FIG. 8 illustrates the formation of the condensed layer and frozen plug of crude oil described above with reference to the graph shown in FIG. 7. Dashed line 88' within FIG. 8 corresponds to dashed line 88 in FIG. 7 and indicates the point at which the crude oil pour point temperature has been reached and at which point the condensed layer of crude oil begins to form. Similarly, dashed line 90' in FIG. 8 corresponds to dashed line 90 in the graph shown in FIG. 7 and indicates the point near the exit end of the down hole shut-in device wherein the apparent melting point temperature has been reached and at which point total closure of the frozen plug is effected.

Once the down hole shut-in device has been activated following a loss of well control and the frozen plug of effluent has been formed within the down hole shut-in device, appropriate repairs may be made to the well in order to regain control thereof. For example, the blow-out may necessitate that repairs be made to the well head or that a new blow-out preventer be installed at the top of the well. When the well is shut-in through formation of the frozen plug, repairs can be made safely as there is no time limit on flow stoppage, no threat of reignition of an earlier fire, or other potential dangers.

After appropriate repairs have been made, the portion of the well above the frozen plug can be filled with extremely heavy mud for counteracting the extreme pressure exerted by the crude oil within the well. At this stage, the cryogen or other refrigerated fluid within volume 54 may be purged and gradually replaced with a warmer, non-compressible liquid. For example, if the refrigerated fluid used to form the frozen plug of effluent is liquid nitrogen, then the liquid nitrogen can be purged with gaseous nitrogen at gradually warmer temperature to effect thawing of the frozen effluent. After the gaseous nitrogen within volume 54 has warmed to the ambient temperature of the down hole fluids, the gaseous nitrogen is replaced with the warm, non-compressible liquid normally maintained within volume 54. The bi-metallic flow deflectors react to the increased temperature by retracting to their initial stowed position flush against inner wall 52. Normal well operations may then be resumed.

The particular geology of the area being drilled is a primary factor in determining the depth at which the down hole shut-in device is installed within the well. During drilling operations, the down hole shut-in device is ideally installed in the last string of casing prior to drilling open-hole into high pressure formations. Nominally, the down hole shut-in device is installed at approximately 4000 feet below the surface. Other factors which affect the determination of the depth at which the down hole shut-in device is installed are the expected fluid phase (liquid/gas), the expected fluid velocity, the expected fluid density and expected fluid temperature which are likely to be encountered in the event of a blow-out. During a typical blow-out condition, the large amount of pressure existing in the bottom of the well causes the well fluid to assume a primarily liquid phase with gases being held in solution due to the high pressure. In a freely depleting well, the pressure on the well fluid decreases as it rises toward the surface where a gaseous phase develops yielding a two-phase (liquid/gas) fluid. Near the surface, the well fluid assumes the form of a fast moving mist having the form of a single-phase gas with droplets of oil dissolved therein. As the well fluid rises through the well, the entrained gas expands, increasing the volume occupied by the well fluid. The rate of mass flow through the well remains relatively constant, and accordingly, the speed of the well fluid increases as it rises through the well due to its increased volume. Consequently, it is advantageous to locate the down hole shut-in device relatively far below the drilling surface where the well fluid is more dense, can be frozen in a shorter period of time, and can minimize the deleterious effect of abrasion caused by the entrainment of sand and other abrasives in the well fluid.

It will now be appreciated by those skilled in the art that an apparatus for impeding the flow of an effluent through a path such as an oil well by forming a frozen plug of the effluent within the path has been described. When used within an oil well, the present apparatus assumes the form of a down hole shut-in device which may be remotely activated at a safe distance from the well head to regain control over the well. The described down hole shut-in device is essentially the same in dimensions as conventional oil field casing or tubing and may be readily incorporated within strings of such casing or tubing installed within the well. The described device may be utilized during both drilling operations and production operations to shutin the well whenever conventional blow-out prevention devices fail. The device is compatible with conventional oil field handling equipment and does not interfere with tools inserted into the well. Although the down hole shut-in device incorporates flow deflectors which move into the path of the effluent when activated, the flow deflectors are activated by change in temperature rather than through mechanical motion. Accordingly, the down hole shut-in device is relatively immune to the abrasive down hole environment within the well. In addition, assuming that the refrigerated fluid used to activate the down hole shut-in device is not vented into the well fluids, no contaminating fluid or foreign matter is added to the well when the down hole shut-in device is actuated.

While the invention has been described with reference to a preferred embodiment thereof, the description is for illustrative purposes only and is not to be construed as limiting the scope of the invention. For example, the present invention may be utilized in conjunction with applications apart from oil wells. The apparatus may be used to cause a frozen plug of effluent to form within an above ground pipe line or any other fluid conducting path. Various other modifications and changes may be made by those skilled in the art without departing from the true spirit and scope of the invention as defined by the appended claims.

What is claimed is:

1. An apparatus for impeding the flow of an effluent through a path by forming a frozen plug of the effluent within the path, said apparatus comprising:
   a. a tubular member located within the path of the effluent, said tubular member including a structural outer wall and an inner wall, said outer and inner walls being substantially cylindrical and concentric with each other, said outer and inner walls bounding a volume therebetween, said inner wall having an outer surface facing said outer wall and an inner surface opposite the outer surface, the path of the effluent being bounded by the inner surface of said inner wall;
   b. means for circulating a refrigerated fluid through the volume bounded by said outer and inner walls for removing heat from said inner wall in order to cool effluent in heat-exchange contact therewith; and
   c. a plurality of flow deflectors each having an end mounted to the inner surface of said inner wall, each of said flow deflectors extending substantially flush against the inner surface of said inner wall in a stowed position when refrigerated fluid is not being circulated through the volume bounded by said outer and inner walls, and each of said flow deflectors being responsive to the circulation of refrigerated fluid through the volume bounded by said outer and inner walls for being deployed to a position projecting away from the inner surface of said inner wall and into the path of the effluent for cooling the effluent and for providing support for the frozen plug of the effluent within said tubular member.

2. An apparatus as recited in claim 1 wherein said refrigerated fluid is a cryogenic fluid.

3. An apparatus as recited in claim 2 wherein said cryogenic fluid is liquid nitrogen.

4. An apparatus as recited in claim 1 further including means for supplying a substantially non-compressible, non-refrigerated fluid under pressure to the volume bounded by said outer and inner walls for transmitting pressure exerted upon the inner surface of said inner wall to said structural outer wall when refrigerated fluid is not being circulated through the volume bounded by said outer and inner walls.

5. An apparatus as recited in claim 4 further including:
   a. a first pressure sensor for sensing pressure exerted upon the inner surface of said inner wall;
   b. a second pressure sensor for sensing pressure exerted upon the outer surface of said inner wall; and
   c. control means responsive to said first and second pressure sensors for controlling the pressure exerted by said substantially non-compressible, non-refrigerated fluid in order to maintain the pressures exerted upon the inner surface and outer surface of said inner wall substantially equal to each other.

6. An apparatus as recited in claim 1 wherein each of said flow deflectors comprises a composite member including a plurality of layers of materials having dissimilar thermal expansion rates for varying the orientation of said composite member in accordance with changes in temperature.

7. An apparatus as recited in claim 1 wherein each of said flow deflectors extends from its first end in a direction generally opposite to the direction in which the effluent flows.

8. An apparatus as recited in claim 7 wherein the inner surface of said inner wall is scored to increase resistance to flow proximate to the inner surface of said inner wall for preventing deployment of said flow deflectors when a refrigerated fluid is not being circulated through the volume bounded by said outer and inner walls and to increase the surface area of said inner wall for increasing heat transfer therethrough.

9. An apparatus as recited in claim 1 wherein at least one of said flow deflectors has a length larger than the radius of said inner wall.

10. An apparatus as recited in claim 1 wherein the thickness of said inner wall is less than or equal to ½ inch.

11. An apparatus as recited in claim 1 wherein said tubular member is made of a material adapted to withstand cryogenic temperatures without damage.

12. An apparatus as recited in claim 1 wherein said refrigerated fluid circulating means comprises:
   a. a supply of refrigerated fluid;
   b. an inlet conduit coupled to said supply of refrigerated fluid and communicating with the volume bounded by said outer and inner walls for supplying refrigerated fluid thereto; and
   c. an outlet communicating with the volume bounded by said outer and inner walls for venting the fluid supplied by the inlet conduit from the volume bounded by said outer and inner walls.

13. An apparatus as recited in claim 11 further including a supply of a substantially non-compressible, non-refrigerated fluid coupled to said inlet conduit for supplying said non-compressible, non-refrigerated fluid to the volume bounded by said outer and inner walls when refrigerated fluid is not being circulated therethrough.

14. A down hole shut-in device for impeding the flow of an effluent from an uncontrolled well, the well extending either into the ground or into an ocean floor, said device comprising:
   a. a tubular member located below the surface of the ground or ocean floor into which the well extends, said tubular member including a structural outer wall and an inner wall, said outer and inner walls being substantially cylindrical and concentric with each other, said outer and inner walls bounding a volume therebetween, said inner wall having an outer surface facing said outer wall and an inner surface opposite the outer surface, the path of the effluent being bounded by the inner surface of said inner wall;
   b. means for circulating a refrigerated fluid through the volume bounded by said outer and inner walls for removing heat from said inner wall in order to cool effluent in heat-exchange contact therewith; and c. a plurality of flow deflectors each having a first end mounted to the inner surface of said inner wall, each of said flow deflectors extending substantially flush against the inner surface of said inner wall in a stowed position when refrigerated fluid is not being circulated through the volume bounded by said outer and inner walls, and each of said flow deflectors being responsive to the circulation of refrigerated fluid through the volume bounded by said outer and inner walls for being deployed to a position projecting away from the inner surface of said inner wall and into the path of the effluent for cooling the effluent and for providing support for a frozen plug of the effluent within said tubular member.

15. A device as recited in claim 14 wherein said tubular member is integrated with a production tubing string of an oil well for stopping the flow of effluent through the production tubing string when a loss of well control occurs during production operations.

16. A device as recited in claim 15 wherein the diameter of said inner wall is substantially equal to the inner diameter of the sections of production tubing forming the production tubing string within which said tubular member is integrated.

17. A device as recited in claim 15 wherein the length of said tubular member is substantially equal to the length of the sections of production tubing forming the production tubing string within which said tubular member is integrated.

18. A device as recited in claim 14 wherein said tubular member is integrated within a production casing string of an oil well for stopping the flow of effluent through the annulus formed between the production casing string and a production tubing string when a loss of well control occurs during production operations.

19. A device as recited in claim 18 wherein the diameter of said inner wall is substantially equal to the inner diameter of the sections of production casing forming the production casing string within which said tubular member is integrated.

20. A device as recited in claim 18 wherein the length of said tubular member is substantially equal to the length of the sections of production casing forming the production casing string within which said tubular member is integrated.

21. A device as recited in claim 14 wherein said tubular member is integrated within a casing string of an oil well for stopping the flow of effluent through the casing string when a loss of well control occurs during drilling operations.

22. A device as recited in claim 21 wherein the diameter of said inner wall is substantially equal to the inner diameter of the sections of casing forming the casing string within which said tubular member is integrated.

23. A device as recited in claim 21 wherein the length of said tubular member is substantially equal to the length of the sections of casing forming the casing string within which said tubular member is integrated.

24. A device as recited in claim 14 wherein said refrigerated fluid is a cryogenic fluid.

25. A device as recited in claim 24 wherein said cryogenic fluid is liquid nitrogen.

26. An apparatus as recited in claim 14 further including means for supplying a substantially non-compressible, non-refrigerated fluid under pressure to the volume bounded by said outer and inner walls for transmitting pressure exerted upon the inner surface of said inner wall to said structural outer wall when refrigerated fluid is not being circulated through the volume bounded by said outer and inner walls.

27. An apparatus as recited in claim 26 further including:
   a. a first pressure sensor for sensing pressure exerted upon the inner surface of said inner wall;
   b. a second pressure sensor for sensing pressure exerted upon the outer surface of said inner wall; and
   c. control means responsive to said first and second pressure sensors for controlling the pressure exerted by said substantially non-compressible, non-refrigerated fluid in order to maintain the pressures exerted upon the inner surface and outer surface of said inner wall substantially equal to each other.

28. An apparatus as recited in claim 14 wherein said refrigerated fluid circulating means comprises:
   a. a supply of refrigerated fluid;
   b. an inlet conduit coupled to said supply of refrigerated fluid and communicating with the volume bounded by said outer and inner walls for supplying refrigerated fluid thereto; and
   c. an outlet communicating with the volume bounded by said outer and inner walls for venting cryogenic fluid therefrom.

29. A device as recited in claim 28 further including a supply of substantially non-compressible, non-refrigerated fluid coupled to said inlet conduit for supplying said non-compressible, non-refrigerated fluid to the volume bounded by said outer and inner walls when refrigerated fluid is not being circulated therethrough.

30. A device as recited in claim 14 wherein each of said flow deflectors comprises a composite member including a plurality of layers of materials having dissimilar thermal expansion rates for varying the orientation of said composite member in accordance with changes in temperature.

31. A device as recited in claim 14 wherein each of said flow deflectors extends from its first end in a direction generally opposite to the direction in which the effluent flows through the well.

32. A device as recited in claim 31 wherein the inner surface of said inner wall is scored to increase resistance to flow proximate to the inner surface of said inner wall for preventing deployment of said flow deflectors when a refrigerated fluid is not being circulated through the volume bounded by said outer and inner walls.

33. A device as recited in claim 14 wherein at least one of said flow deflectors has a length larger than the radius of said inner wall.

34. A device as recited in claim 14 wherein the thickness of said inner wall is less than or equal to ½ inch.

35. A device as recited in claim 14 wherein said tubular member is made of a material adapted to withstand cryogenic temperatures without damage.

* * * * *